United States Patent

[11] 3,587,350

| [72] | Inventor | Bert R. Wanlass<br>Warren, Mich. |
|---|---|---|
| [21] | Appl. No. | 834,249 |
| [22] | Filed | June 18, 1969 |
| [45] | Patented | June 28, 1971 |
| [73] | Assignee | General Motors Corporation, Detroit, Mich. |

[54] POWER TRANSMISSION INCLUDING FRICTION DRIVE AND GEAR DRIVE
19 Claims, 7 Drawing Figs.

[52] U.S. Cl. ................................................ 74/800, 74/640
[51] Int. Cl. .................................................. F16h 1/28
[50] Field of Search ......................................... 74/665, 798, 800, 640

[56] References Cited
UNITED STATES PATENTS

| 2,906,143 | 9/1959 | Musser | 74/640 |
|---|---|---|---|
| 2,931,248 | 4/1960 | Musser | 74/640 |
| 2,935,714 | 5/1960 | Barden et al. | 74/798 |
| 3,182,525 | 5/1965 | Tinder et al. | 74/640 |
| 3,199,370 | 8/1965 | Prior | 74/640 |
| 3,244,026 | 4/1966 | Dekay | 74/798 |
| 3,304,809 | 2/1967 | Hellen | 74/640 |

*Primary Examiner*—C. J. Husar
*Attorneys*—E. W. Christen, A. M. Heiter and Charles R. White ABSTRACT: Speed-reducing transmission having a ball driven in an orbital path about the armature shaft of a drive motor at a predetermined speed ratio. The orbiting ball actuates strain-wave-type gearing that further multiplies the speed ratio provided by the ball to drive an output. This transmission may have elastomeric parts which provide for automatic adjustment for wear of the transmission components and which reduce slippage between these parts. A plurality of these transmissions can be readily coupled in series to provide a multistage transmission for producing large reduction ratios. There is a differential reduction drive possible by having strain-wave gearing drive a transmission housing relative to a support in one direction at a first speed ratio and by having the output shaft rotatably driven by strain-wave gearing at a second speed ratio relative to the case and in an opposite direction to produce a differential reduction drive. One of the embodiments provides a mechanism for unlocking the drive so that the output may freewheel in either direction permitting override manual operation.

INVENTOR
Bert R. Wanlass
BY
Charles R. White
ATTORNEY

PATENTED JUN28 1971

INVENTOR.
Bert R. Wanlass
BY
Charles L. White
ATTORNEY

POWER TRANSMISSION INCLUDING FRICTION DRIVE AND GEAR DRIVE

This invention relates in general to power transmissions and particularly to a change speed transmission incorporating a friction drive for changing input speed and for new and improved actuation and drive of strain-wave gearing.

For the effective and efficient power operation of many devices such as folding tops for vehicles, power windows, door openers, hoists, indexing drives and antenna rotors, it is often necessary to utilize power transmissions having large reduction ratios. For example, a transmission for power windows often requires a reduction ratio of about 200:1 while a vehicle having a folding top often requires a ratio of 400:1. Still higher ratios are often needed for indexing devices and for antenna rotors for space vehicles. The prior art speed-reducing transmissions have been generally satisfactory. However, to meet increased demands for more efficient transmission of power at larger reduction ratios utilizing minimum number of parts, advanced transmissions are necessary.

This invention in power transmissions satisfies many of these demands by employing friction drive and strain-wave-type gearing having a synergistic cooperation providing desired reduction ratios. In this invention, a minimum number of parts are employed in a package having small radial size and short axial length readily adaptable for end mounting on a drive motor. Power is transmitted through a planetary ball drive and then through the strain-wave gearing. Relatively high efficiency is obtained because of the rolling action of the ball. The strain-wave gearing is actuated by the orbiting planet ball to further multiply the reduction ratios provided by the planetary drive. The driven part of the strain-wave gearing may be integral with the transmission output to eliminate backlash between these parts. There is low noise level in this transmission because tooth contact in the strain-wave gearing is at an instantaneous zero radial velocity and because of the rolling action of the ball in the planetary drive. This invention has yieldable construction to provide for automatic takeup of wear of transmission parts to insure that slippage of these parts is minimized. This invention provides for the coupling of transmission units in stages to provide for further multiplication of speed reduction ratio as required while maintaining small power package size. In one embodiment of the invention, the strain-wave gearing can be disengaged completely to provide complete freewheeling of the output shaft and to permit an override operation if necessary.

Another feature and object of this invention is to provide a new and improved power transmission incorporating a friction drive for producing a (predetermined speed ratio and for improved actuation of strain-wave gear construction which operates to multiply the ratio produced by the friction drive.

Another feature and object of this invention is to provide a power transmission incorporating friction drive means having a yieldable component to lightly load the parts to compensate for wear and to keep the parts from slipping during operation.

Another object of this invention is to provide a plurality of power transmission units which are made to readily fit together in a compact multistage package to produce large reduction ratios.

Another object of this invention is to provide a differential reduction drive in which a transmission housing is driven relative to a support in one direction and the output shaft is driven relative to the housing in an opposite direction by strain-wave gearing to produce a residual or differential rotation of the output relative to the mount to provide a large reduction ratio.

Another object of this invention is to provide a power transmission having a friction drive with improved clutching means for disengaging the drive at any time; the input shaft is radially stepped or otherwise reduced in the area of ball contact to permit disengagement of a wobble plate with the housing teeth thus providing complete freewheeling of the output shaft.

These features, advantages, objects and other aspects of the invention will become more apparent from the following detailed description and drawings in which.

Figure 1:
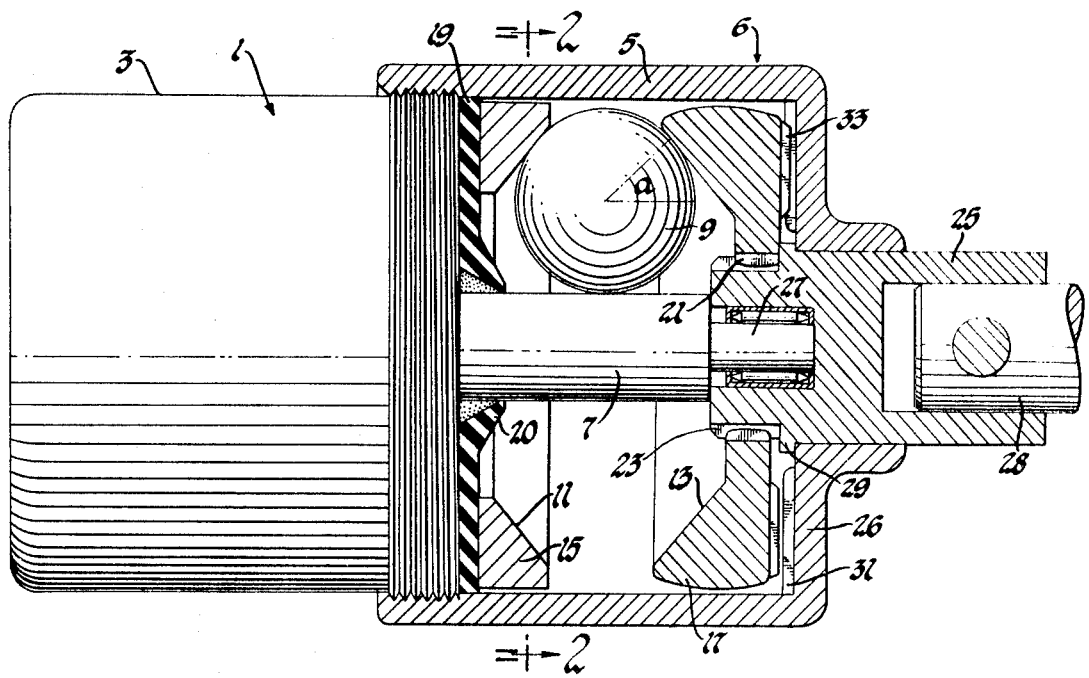
FIG. 1 is a side view of a first embodiment of this invention partly in section.

In FIG. 1, there is a motor 1 having a case 3 to which is threadedly secured a housing 5 of a speed-reducing power transmission unit 6. The motor has a cylindrical drive shaft 7, which extends axially into the transmission housing. A ball 9 is disposed in the housing in rolling contact with the outer surface of drive shaft 7, as well as with the opposing conical faces 11 and 13 of raceway 15 and wobble plate 17. Raceway 15 is a disclike structure with a central opening to permit shaft 7 to pass therethrough. There is also a slight clearance between the annular outer periphery of raceway 15 and the inner surface of housing 5 to allow for axial movement of the raceway toward the wobble plate to provide an adjustment. This is accomplished by employing an elastomeric seal and wear compensating annulus 19, compressed between the raceway and the end of the motor case. This annulus provides an axial force which lightly loads the raceway, ball and wobble plate to minimize slippage and to provide immediate and automatic compensation for any wear of these parts thereby improving efficiency of operation. This annulus has inner lip 20 contacting shaft 7 to provide a seal preventing escape of lubricants from the housing 5. Preferably in this embodiment, the ball is steel while the raceway and wobble plate are made of sintered metal or steel.

The wobble plate 17 has a central opening formed with radially and inwardly projecting splines 21 which drivingly mesh with splines 23 provided on the end of the rotatable output member 25. This member is rotatably journaled in the end wall 26 of housing 5 and projects from the inside of the housing to the outside. An output shaft 28 is drivingly connected to the output member 25. The drive shaft 7 has at its end a reduced extension 27 supported by a suitable needle bearing located in a recess formed in the end of the output member 25. The top lands of splines 21 are convexly curved in a longitudinal direction and serve as rockers for the wobble plate. Adequate clearance is provided between the splines of the wobble plate and the output drive to allow the wobble plate to rock on splines 21 as the ball orbits around shaft 7 when it is rotating and driving the ball.

In the FIG. 1 position, the ball has effected maximum separation between the upper sectors of raceway 15 and the upper sectors of the wobble plate 17. Output member 25 has an annular retainer shoulder 29 slightly larger than the opening in end wall 26 for output member 25 which serves as a bearing for the wobble plate so that the lower sectors between raceway 15 and the wobble plate have minimum separation at this time. As the ball orbits the maximum separation accompanies ball position and minimum separation is opposite to the ball position.

The wobble plate 17 and the end wall of housing 5 form a strain-wave speed reduction gear unit. The inner side of the end wall is provided with a predetermined number of gear teeth 31 which are progressively engaged by gear teeth 33 formed on the end of the wobble plate adjacent to end wall 26. As best shown in FIG. 1 the teeth of the plate 17 and end wall 26 are progressively engaged and disengaged by action of the ball on the wobble plate. The wobble plate has one less tooth than the end wall so that the progressive annular engagement and disengagement of the teeth of the gear unit will effect the rotation of the wobble plate relative to the end wall by a distance equal to the thickness of one tooth for each orbit of ball 9.

The drive shaft 7, ball 9 and raceway 15 act as a speed-reducing planetary unit. As the shaft 7 rotates in one direction, the ball will revolve in an opposite direction and orbit at a reduced speed in raceway 15 about the axis of shaft 7 in the direction that shaft 7 is turning. The projected diameter $y$ of the circle on the planet ball which contacts the conical face 13 on the circular orbit path $z$, is less than the actual diameter of the planet ball. This construction produces an action similar to a stepped-planet planetary drive and the same equations for that type drive can be used for the ball planet drive. Assuming a ball diameter of 0.900 inch, a drive shaft diameter of 0.500 inch and an angle $a$ of ball contact with the wobble plate relative to the center line of shaft 7 of 45°, the ball will orbit once for every 6.75 revolutions of the input shaft to provide a 6.75:1 reduction ratio.

As the ball orbits and makes contact with the contact path $z$ on the wobble plate, it effects precession of the rotational axis of the wobble plate. When this occurs, the teeth of the wobble plate and end wall move into and out of tooth engagement by axial motion of the teeth of one gear relative to another. The successive progressive engagement and disengagement results in an angular displacement of the wobble plate equal to the tooth differential between the wobble plate and the end plate. For example, if wobble plate 17 has 70 teeth and the end wall or plate 26 has 71 teeth the resulting angular movement of the wobble plate and connected output shaft would be 1/70 of one revolution for each orbit of ball 9.

The overall speed reduction will be the ratio of the ball reduction multiplied by the ratio of the gear unit which, using the example set forth above would be 472.5:1. Because of its compactness and efficiency and its large reduction ratio, this embodiment of the invention would be particularly suitable for power-operated convertible tops.

Figure 3:
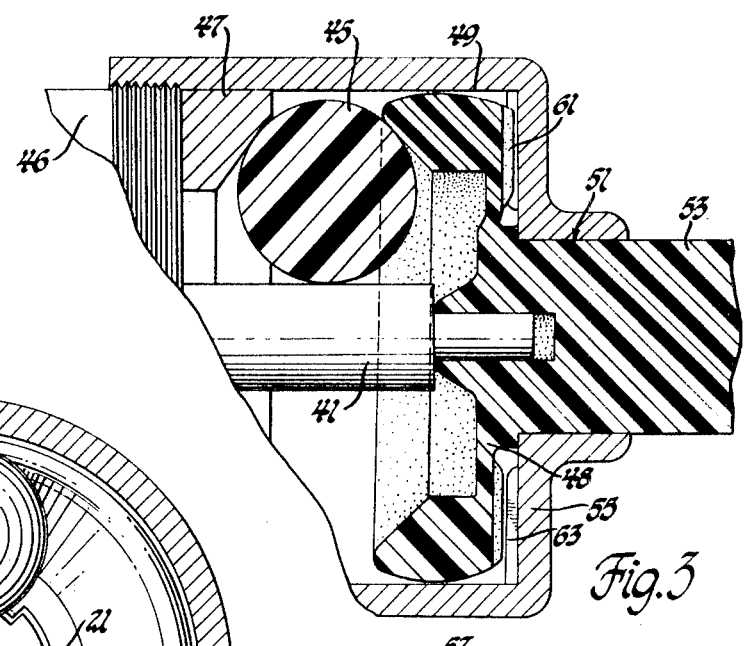
FIG. 3 is a view similar to FIG. 1 showing a second embodiment of the invention.
Figure 2:
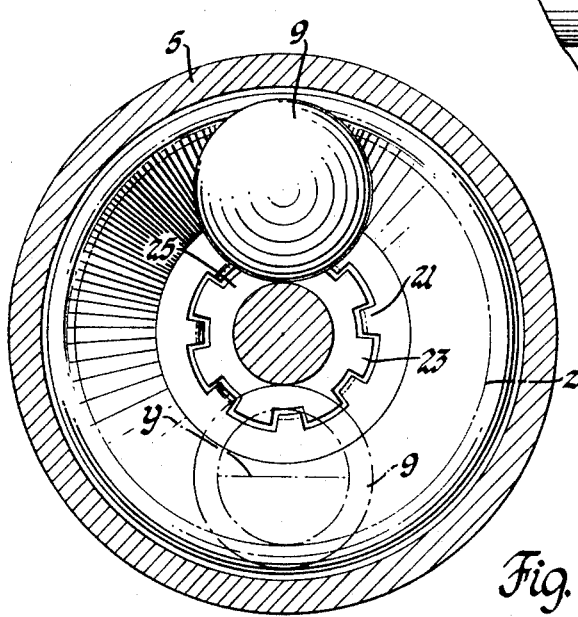
FIG. 2 is a view taken along lines 2—2 of FIG. 1.

Another embodiment of the invention, generally similar to the embodiment of FIGS. 1 and 2 is illustrated in FIG. 3.

This embodiment has a cylindrical shaft 41 of a motor 46 which shaft is in driving contact with a ball 45 of a suitable elastomeric material. The shaft is piloted in an output shaft for stability as in the previous embodiment. In addition to contact with shaft 41, the ball is in rolling contact with the conical surface of raceway 47 and with the conical surface of drive disc 49 of a one-piece output 51 formed from a resilient plastic material such as teflon or nylon. The raceway and drive disc are spaced so that the ball can displace and flex successive sectors for the drive disc axially away from the motor as the ball orbits. The output includes an output shaft 53 journaled for rotation in an end plate 55 suitably secured to the transmission housing 57. The housing, as in the first embodiment, is threadedly secured to the housing of motor 46. The connecting portion 48 of the output which joins drive disc 49 and shaft 53 is of reduced thickness to allow the successive sectors of the drive disc to be readily flexed by the ball 45 in response to orbiting of the ball around the shaft 41. As the ball leaves a sector, the drive plate will spring back to its normal position.

The drive disc 49 has a predetermined number of gear teeth 61 on one side which are progressively engageable and disengageable with the gear teeth 63 on the inside of the end plate in the manner described in connection with the first embodiment. The end plate has one more tooth than the drive plate so that one revolution of the ball will effect the angular advancement of the output 51 by the distance substantially equal to one tooth.

The elastomeric ball is effective to spring load the meshing gear teeth to compensate for wear and reduce backlash in the gearing. Since the drive disc 49 and shaft 53 are of one piece construction, there is no looseness or backlash between these elements as could possibly occur in the FIG. 1 construction.

Operation of this embodiment is similar to that of the first embodiment. The ball drive provides a first speed reduction and effects a further reduction of speed by causing the geared elements to mesh in successive sectors along with the orbiting of the ball. The reduction ratio of the ball drive is multiplied by the reduction ratio provided by the gearing to provide a high reduction input-to-output speed ratio.

Figure 4:
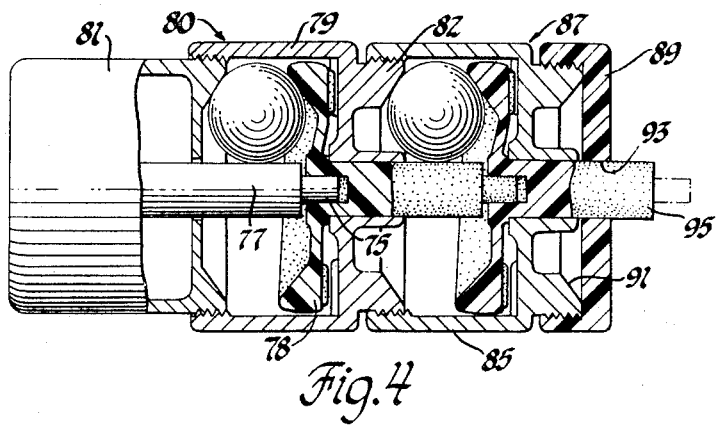
FIG. 4 is a side view illustrating a third embodiment of the invention.

FIG. 4 shows the connection of two units in series for further increasing the reduction ratio. The interior components of each of these units, raceways, balls and drive discs, are similar to those of the FIG. 3 embodiment. However, the ball may be made of a suitable metal instead of an elastomer if desired. The drive disc and output shaft are unitary and are formed from a resilient plastic material and the extension 75 of the output shaft 77 of the first unit is piloted in an opening in the drive disc 78 of the first unit.

As shown, the housing 79 of a first reduction unit 80 is threadedly secured to the case of motor 81. This housing also has an annular projecting shoulder 82 threaded to permit the housing 85 of a second reduction unit 87 to be securely fastened thereon to form a rigid housing for a large reduction ratio drive that has a small radial size and comparatively short axial length. A protective end cap 89, preferably of a suitable plastic material, is threaded on the final unit to protect the raceway 91 of this unit. The end cap has a central opening 93 through which the projecting output shaft 95 of the final output shaft extends. This cap can be readily removed to permit other units to be installed in series to provide for further multiplication of the reduction ratio. In FIG. 4, assuming that the reduction ratio of each unit is 470:1, the total overall reduction of the two units will be 220,900:1.

Figure 5:
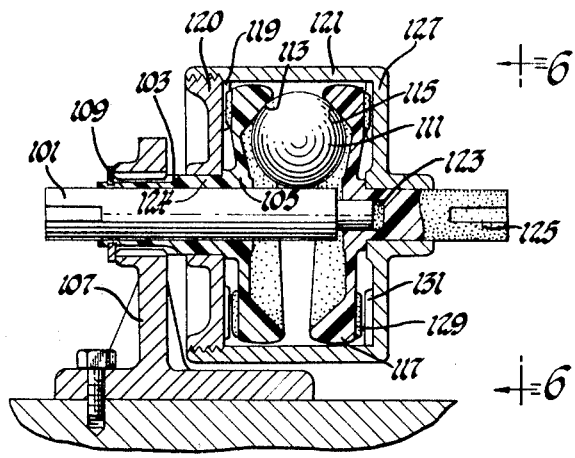
FIG. 5 is a side view particularly in section showing a fourth embodiment of the invention.
Figure 6:
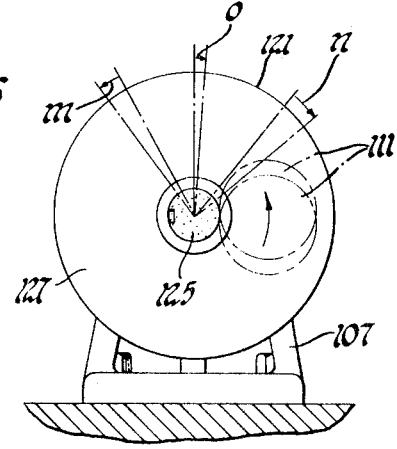
FIG. 6 is a view taken along lines 6—6 of FIG. 5.

In FIGS. 5 and 6 another embodiment of the invention is illustrated which provides a large reduction ratio having a short axial length and small radial size. In this embodiment, there is an elongated, motor-driven, cylindrical input shaft 101, which extends through and is rotatably mounted in the axially projecting collar 103 of a flexible drive disc 105 that is generally the same as the embodiment described in connection with FIG. 3. The collar 103 of disc 105 is splined to a stationary supporting mount 107 and is retained in position by snapring 109. As in the previous embodiments, there is a ball 111 in rolling contact with the shaft 101 and also in rolling contact with the conical surface 113 of the flexible disc 105 and the conical surface 115 of a flexible output drive disc 117. The discs are substantially the same in construction as drive disc 49 and each has a continuous arrangement of gear teeth on its outer face. The teeth of drive disc 105 are meshingly engageable with the teeth of gear 119 on the end plate 120 of the housing for the reduction drive unit 121. The end plate 120 is rotatably mounted on the shoulder 124 of the drive disc 105. The drive disc 117 is formed with an axial pilot opening 123 for the reduced end of the input shaft; also this drive disc has an axially extending output shaft 125 which is rotatably supported in the end wall 127 of the housing. This drive disc has gear teeth 129 on its outboard side which are progressively engageable and disengageable with teeth of gear 131 fixed on the inside of the end wall. In this embodiment of the invention, tooth numbers of the gear elements are selected to produce predetermined rotation of the case relative to the mount in one direction and a different amount of rotation of the output shaft relative to the case in an opposite direction to produce a residual or differential rotation of the output shaft relative to the mount effecting a large reduction ratio. For example, if there are 70 teeth on the drive disc 105 and the gear 119 has 71 teeth, there will be a counterclockwise case rotation $m$ of 1/70 of a revolution relative to the mount or a ratio 70:1 for each orbit of the ball as shown in FIG. 6. Assuming that drive disc 117 has 69 teeth and the gear 131 has 70 teeth, the shaft 125 will be driven 1/69 of a revolution $n$ clockwise relative to the housing for each orbit of ball 111. It will be then understood that the residual or differential rotation $o$ of the output shaft relative to the mount is 1/70 × 1/69 or 1/4830 in the counterclockwise direction as shown in FIG. 6.

Figure 7:
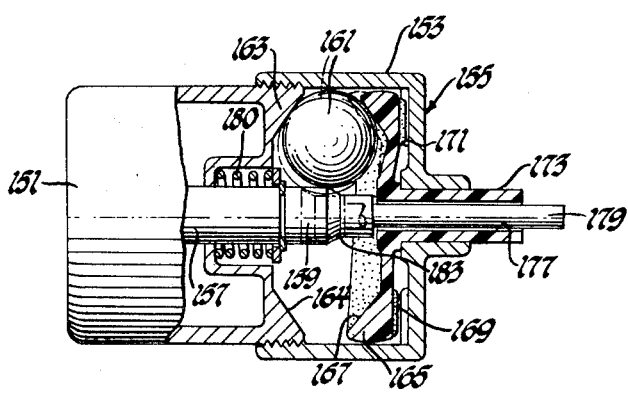
FIG. 7 is a sectional view of a fifth embodiment of the invention.

Turning now to FIG. 7 there is another embodiment of this invention which basically corresponds to the FIG. 3 embodiment but provides for drive disengagement at any time.

In this embodiment there is a motor 151 to which is secured a housing 153 of a speed-reducing unit 155. The motor has an axially projecting drive shaft 157 which extends completely through the housing and which has a cylindrical drive surface 159 that drivingly engages the ball 161. There is also a raceway 163 integral with the motor housing having a conical surface 164 which is normally engaged by the ball. There is also a drive disc 165 of plastic material which generally corresponds to the drive disc 49 of FIG. 3 and which has a conical surface 167 that normally contacts the ball 161 and confines the ball to an orbital path of travel. The disc 165 has an integral gear with teeth 169 which progressively mesh with the gear teeth 171 formed on the inside of the housing 153. As in the previous embodiments there is a one-tooth differential between the teeth 169 and 171. The output shaft 173 is integral with and extends axially from the drive disc 165 and has an axial passage 177 which permits an extension 179 of the drive shaft 157 to extend therethrough. As shown, this drive shaft is biased to the full line position by a spring 180 which surrounds shaft 157 and which is seated in a pocket formed in the case of the motor 151. This spring has a working end contacting a washer trapped between the spring and a suitable clip, fastened on the shaft 157. In the full line position, the cylindrical drive portion of the shaft is in driving contact with the ball and the ball diameter and the path of the travel of the ball are such that the ball will force the successive sectors of the gear on drive disc 165 into engagement with the teeth 171 as the ball orbits in response to rotation of shaft 157.

Adjacent to cylindrical drive surface 159 and to the inner portion of extension 179, the shaft 157 is radially stepped at 183 to provide for the complete disengagement of the teeth of the drive disc and this housing. In the event that freewheeling of the output is desired, the extension 179 is pushed axially against the force of spring 180 to the phantom line position and the ball will be positioned closer to the axis of shaft 157 and cannot engage the conical surfaces of raceway 163 and the drive disc 165.

To reengage the ball, the extension 179 is released from the declutching force and the spring will automatically push the drive shaft back to the drive position illustrated in the full lines. Spur gearing or other construction may be driven by the output 173.

This construction permits disengagement of the drive plate with the housing teeth thus providing complete freewheeling of the output shaft. This is important where manual override operation is important such as in garage doors. The FIG. 5 construction also provides an important advancement in clutching since the engaging teeth surfaces are rotationally at zero relative velocity to each other at the instant of engagement. This improves wear and advances service life of the unit.

It will be appreciated that the constructions illustrated in this invention have many applications other than those specifically mentioned. For example, by virtue of the large reduction ratios available, these transmissions are highly suitable for gas turbine engine applications.

Although particular embodiments of the invention have been shown and described, there are modifications, which are obvious to those skilled in the art. The limitations of the invention are set forth in the following claims:

I claim:

1. In combination with a motor and a drive shaft extending from said motor for rotation about a longitudinal axis; a transmission comprising spherical planet means drivingly engaged by said drive shaft and revolvable about said longitudinal axis, a raceway between said motor and said planet means and engaged by said planet means, said raceway being disposed around said drive shaft and laterally spaced from said motor, strain-wave gearing disposed about said longitudinal axis and laterally spaced from said raceway, said gearing having first gear means formed with a contact surface drivingly engaged by said planet means, said contact surface being opposite said raceway, said strain-wave gearing having second gear means drivingly engaging said first gear means as said planet means revolves about said drive shaft, a transmission output member driven by said first gear means, said planet means having an annular contact circle which contacts said first gear means as said planet means revolves about said drive shaft, said contact circle having a diameter less than the diameter of said planet means for providing a planetary drive and speed reduction like that of a stepped-planet planetary drive and to actuate said strain-wave gearing to thereby produce an input-to-output speed ratio equal to that speed ratio of the planetary drive multiplied by the speed ratio of said strain-wave gearing.

2. The combination defined in claim 1 and further comprising a housing for said transmission, said motor being fixed to said housing and having an end wall with said drive shaft extending therefrom into said housing, said housing having a laterally extending end wall through which said output member extends, said second gear means being disposed on the interior of said end wall of said housing for engagement with said first gear means as said first gear means is biased axially by said planet means as said planet means revolves about said drive shaft.

3. The combination defined in claim 1 and further comprising a housing for said transmission, said motor having an end portion, said drive shaft extending therefrom into said housing and having an end portion rotatably mounted in said output member and, said first gear means of said strain-wave gearing having a conical face with a curved contact path for contact by said planetary member.

4. The combination defined in claim 3 wherein said first gear means is a metal wobble plate and, spline means for coupling said wobble plate to said output member.

5. The combination defined in claim 3 wherein said first gear means and said output member comprise a one-piece component of a plastic suitable for transmitting torque.

6. The combination defined in claim 3 wherein said first gear means and said output member comprise a plastic one-piece component and wherein said planetary member is an elastomeric spherical ball.

7. The combination defined in claim 3, said planet means being a ball, operator means operatively connected to said drive shaft for axially displacing said drive shaft, said drive shaft having a reduced diameter portion for receiving said ball in response to predetermined axial movement of said drive shaft to effect the drive disengagement of said strain-wave gearing.

8. In a power transmission, input means and output means rotatable about a longitudinal axis, speed-changing means operatively connecting said input and output means, said speed-changing means comprising an annular input member rotatably driven by said input means, a planetary ball member driven by said input member, an annular raceway disposed radially from said axis providing a track for said planetary ball member, a drive plate longitudinally spaced from said raceway along the rotational axis of said input means, said drive plate having a conical surface providing a circular contact path for said planetary member, connecting means for connecting said drive plate to said output means, said drive plate having a predetermined number of annularly arranged teeth on one side thereof, gear means having at least one more tooth than said drive plate engaging said teeth on said drive plate, and said planetary member having a contact circle thereon which engages said plate, said contact circle having a diameter less than the diameter of said planetary member to provide a reduction as a stepped-planet planetary drive, and said drive plate being forced to walk in said gear means in response to the orbiting of said planetary member to effect the rotation of said drive plate and said output shaft by a ratio equal to the number of teeth in said drive plate divided by the difference between the number of teeth on said drive plate and on said gear.

9. In a power transmission having input means and output means, said input means including drive means rotatable about a longitudinal axis, a raceway disposed around said axis of said drive means, gear means rotatable about said axis and longitudinally spaced along said axis from said raceway and having first and second sides, said rotatable gear means having a predetermined number of gear teeth on said first side and having an annular contact path on said second side, a planet member driven by said drive means for engaging said raceway and said contact path to propogate processional movement of said rotatable gear means about said longitudinal axis, fixed gear means longitudinally spaced along said axis from said raceway and meshingly engageable and disengageable by said rotatable gear means as it precesses, said fixed gear means having at least one more tooth than said rotatable gear means to provide a geared ratio equal to the number of teeth on said rotatable gear divided by the difference between the number of teeth on said fixed gear means and said rotatable gear means, and connecting means for drivingly connecting said rotatable gear means to said output means so that the progressive engagement and disengagement of said teeth of said fixed gear means by said rotatable gear means in response to the orbiting of said planet member effects the rotation of said rotatable gear means and said connected output means.

10. The power transmission of claim 9, said input means comprising a motor, a housing for said transmission secured to said motor and, yieldable means for maintaining said planet member in contact with said raceway and said contact path of said gear means and said drive means and for reducing backlash between the meshing teeth of said gear means.

11. The power transmission of claim 9, said input means comprising a motor having a case with an end portion, a housing for said transmission, connecting means for coupling said transmission housing to said motor case so that it extends axially from said end portion, yieldable means disposed between said end portion of said motor case and said raceway for exerting a force on said raceway to keep said raceway and said planetary member and said drive means in contact with each other to compensate for wear and to reduce slippage of said planetary member and said raceway and said drive means.

12. The power transmission of claim 9 wherein said means for drivingly connecting said gear means to said output are meshing spline means for permitting said planet member to force the cooperating gears into and out of tooth engagement by radial motion of the teeth of one gear means relative to the other.

13. The power transmission of claim 9 wherein said planet member is a spherical elastomeric roller and said rotatable gear means and said output are integral and are formed from a plastic material.

14. In a power transmission, support means for said transmission, rotatable transmission input means, transmission output means, planet means driven in an orbital path by said input means, first and second spaced power-transmitting means on each side of said planet means for contacting said planet means and for confining said planet means in an orbital path of travel, a housing for said transmission rotatably mounted with respect to said support means and having spaced gear means thereon, said first power-transmitting means having gear means engaging with a first of said gear means on said housing to effect a predetermined rotation of said housing relative to said support means in one direction, and said second power-transmitting means having gear means engageable with the other of said gear means on said housing to produce a predetermined rotation of said output means relative to said housing in an opposite direction and thereby produce a resultant rotation of said output means relative to said support means.

15. The transmission of claim 14 wherein said gear means of said first power-transmitting means and said housing comprises a first strain-wave gear unit and wherein said gear means of said second power-transmitting means and said housing comprises a second strain-wave gear unit.

16. In a power transmission, a longitudinally movable transmission input means having an annular drive surface, transmission output means, ball means drivingly engaged by said drive surface, said input means having a ball-engaging surface of reduced diameter as compared to the diameter of said annular drive surface, a raceway for said ball means, a drive disc having a conical surface engaged by said ball means drivingly connected to said transmission output means, a transmission housing having fixed gear means, said drive disc having gear means for engaging said fixed gear means only when said ball means engages said drive surface, said output shaft having an opening therethrough, an actuator extending from said transmission input means which extends through said opening for moving said transmission input means to a predetermined position whereby one of said surfaces engages said ball.

17. The transmission of claim 16 and including spring means for biasing said input means to a position in which said ball is drivingly engaged by said drive surface.

18. In a power transmission, transmission input means, speed-changing transmission means driven by said input means, intermediate drive means driven by said speed-changing transmission means, second speed-changing transmission means driven by said intermediate means, an output driven by said last-mentioned speed-changing means, first housing means for said first speed-changing transmission means, second housing means for said second speed-changing transmission means, means for coupling said housing means together and means for connecting both of said housing means to the housing of said input motor.

19. The transmission defined in claim 18 above, wherein the said input means is piloted in said intermediate drive means and said intermediate means is piloted into said output means.